United States Patent
Prakash et al.

(10) Patent No.: US 9,974,035 B2
(45) Date of Patent: May 15, 2018

(54) SYNCHRONIZATION BETWEEN LOW ENERGY END POINT DEVICES AND PARENT DEVICES IN A TIME SLOTTED CHANNEL HOPPING NETWORK

(71) Applicant: Landis+Gyr Innovations, Inc., Alpharetta, GA (US)

(72) Inventors: Vidya Prakash, Alpharetta, GA (US); Saurabh Jain, Ghaziabad (IN); Christopher Scott Hett, Smyrna, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days. days.

(21) Appl. No.: 15/291,690

(22) Filed: Oct. 12, 2016

(65) Prior Publication Data
US 2018/0103443 A1 Apr. 12, 2018

(51) Int. Cl.
*H04W 72/04* (2009.01)
*H04W 52/02* (2009.01)
(Continued)

(52) U.S. Cl.
CPC .......... *H04W 56/001* (2013.01); *H04B 1/713* (2013.01); *H04H 20/38* (2013.01);
(Continued)

(58) Field of Classification Search
CPC ............... H04W 76/025; H04W 52/00; H04W 52/0219; H04W 52/0206; H04W 56/001;
(Continued)

(56) References Cited

U.S. PATENT DOCUMENTS

2015/0245287 A1 8/2015 Shudark et al.
2016/0044621 A1* 2/2016 Ding ................ H04W 56/0025
370/350
(Continued)

OTHER PUBLICATIONS

Kang, Time Slotted Channel Hopping MAC; 15-08-0581-00-004e-time-slotted-channel-hopping-mac, IEEE Draft; 15-08-0581-00-004E-Time-Slotted-Channel-Hopping-MAC, IEEE-SA Mentor, Piscataway, NJ, USA, vol. 802, Issue 154e, Sep. 1, 2008, pp. 1-34.

(Continued)

*Primary Examiner* — Philip Sobutka
(74) *Attorney, Agent, or Firm* — Kilpatrick Townsend & Stockton LLP

(57) ABSTRACT

Systems and methods are disclosed for synchronizing communications between a parent device operating on a time-slotted channel hopping (TSCH) protocol and a low-energy network device operating on a low-energy channel hopping protocol. The parent device sub-divides TSCH timeslots and communicates with adjacent TSCH devices during a primary portion of the timeslot and listens for communications from a connected low-energy device during the secondary portion of the timeslot. Upon receiving a synchronization request from a low-energy device, the TSCH device transmits a synchronization response comprising synchronization data. The synchronization data allows the low-energy device to synchronize communications with the TSCH network by synchronizing with the channel hopping pattern of the TSCH protocol.

23 Claims, 10 Drawing Sheets

(51) Int. Cl.
    *H04W 56/00*     (2009.01)
    *H04B 1/713*     (2011.01)
    *H04W 40/00*     (2009.01)
    *H04L 5/00*     (2006.01)
    *H04H 20/38*     (2008.01)

(52) U.S. Cl.
    CPC ......... *H04L 5/0055* (2013.01); *H04W 40/005* (2013.01); *H04W 72/0446* (2013.01)

(58) Field of Classification Search
    CPC .. H04W 72/0446; H04W 84/18; H04B 1/713; H04B 1/7156; H04B 1/69
    USPC ............ 455/450, 452.1, 67.11; 370/311, 336
    See application file for complete search history.

(56) References Cited

U.S. PATENT DOCUMENTS

2016/0204827 A1*   7/2016   Shih .................... H04B 1/7143
                                                                             375/132
2017/0156144 A1     6/2017   Shudark et al.

OTHER PUBLICATIONS

International Application No. PCT/US2017/055281, Invitation to Pay Additional Fees and Partial Search Report dated Dec. 13, 2017, 5 pages.
International Patent Application No. PCT/US2017/055281, "International Search Report and Written Opinion", dated Mar. 5, 2018, 20 pages.

\* cited by examiner

SYNCHRONIZATION BETWEEN LOW ENERGY END POINT DEVICES AND PARENT DEVICES IN A TIME SLOTTED CHANNEL HOPPING NETWORK

TECHNICAL FIELD

This disclosure relates generally to networking and more particularly relates to a synchronization mechanism between low energy end point devices and AC powered devices in a time slotted channel hopping IEEE 802.15.4 network.

BACKGROUND

Systems and methods are provided improving the join time of low energy devices in a time slotted channel hopping (TSCH) network. Utility companies, home automation providers, industrial automation providers, scientific and environmental application providers, and other resource providers may communicate with endpoints via devices operating on a TSCH network, defined by IEEE 802.15.4. Powered parent devices (e.g., electric meters, routers) are connected via a TSCH network, which is referred to as the primary network or the primary TSCH network (PN-TSCH). Powered parent devices are also referred to herein as parent nodes or TSCH nodes. To maintain synchronization, powered TSCH nodes communicate with each other and maintain synchronization with each other through the use of periodic beacons that are transmitted between TSCH nodes.

Low energy (LE) devices are used to monitor and/or manage consumption of resources (e.g., electricity, heat, water, other utilities, as well as other types of resources). In some aspects, LE devices can be Internet-Of-Things (IoT) enabled devices that can be used in smart power grid and smart home technologies. Low energy devices are utilized as endpoints in TSCH networks and communicate messages with A/C powered parent nodes. Low energy devices (also referred to as LE nodes, LE endpoints, LE endpoint nodes) include battery powered devices, energy harvesting devices, and vampire tapping devices. LE endpoints utilize a second, low energy hopping pattern in a secondary TSCH network. The secondary TSCH network utilized by the LE endpoints uses a channel hopping protocol in which channel frequencies switch at a much slower rate than the primary TSCH network used by the parent devices. The secondary TSCH network is referred to herein as an LE TSCH network. The slower channel hopping protocol utilized by the LE network is referred to as a low energy channel hopping protocol. To save on power consumption and conserve battery life, the LE-TSCH network allows LE devices to enter a sleep state (i.e. turning off higher powered electronics such as oscillators). Because LE devices are limited in the possible number of transmissions in a given TSCH slot frame, LE devices do not transmit or receive beacons from A/C powered parent nodes for regular synchronization. There is a need for a mechanism that allows for synchronization between parent TSCH nodes and battery powered LE devices.

SUMMARY

Systems and methods are disclosed for synchronizing communications between a parent device communicating on a primary time-slotted channel hopping (TSCH) network using a TSCH protocol and low-energy endpoint devices connected to the parent device that operate using a low-energy channel hopping protocol. The low-energy channel hopping protocol is a TSCH protocol with a slower channel hopping rate compared to the TSCH protocol used by the primary TSCH network. The low-energy endpoint devices are powered by a battery source and operate during wake states of a sleep/wake cycle in order to conserve battery life. The TSCH parent devices are configured to communicate with adjacent TSCH devices during a primary portion of a TSCH timeslot on the frequency channel determined by the TSCH channel hopping pattern and listen for communications from low-energy endpoint devices during a secondary portion of the TSCH timeslot on the low-energy network frequency channel.

Upon exiting a sleep state and entering a wake state, the low-energy endpoint device transmits a synchronization request to the TSCH parent device a on low-energy network frequency. Upon receiving the synchronization request during the secondary portion of the TSCH timeslot, the TSCH parent device transmits an acknowledgment signal followed by a synchronization response. The synchronization response is transmitted on the low-energy network frequency channel. The synchronization response includes synchronization data allowing the low-energy endpoint device to synchronize communications with the channel hopping pattern of the TSCH protocol used by the primary TSCH network. The low-energy endpoint device may also realign timing to account for clock drift that may have occurred during the sleep state. Synchronizing communications of the low-energy network device with the channel hopping pattern of the primary TSCH network causes the low-energy network device to switch channels at the faster rate of the TSCH protocol used by the primary TSCH network. In response, the low-energy endpoint device transmits a synchronization acknowledgment response to the TSCH parent device, indicating that the low-energy endpoint device is synchronized with the TSCH protocol channel hopping pattern of the primary TSCH network.

In additional embodiments, the TSCH parent device initiates synchronization by transmitting synchronization responses periodically on the low-energy network frequency channel. In one aspect, synchronization responses are transmitted at predefined intervals to connected low-energy devices. In other embodiments, the synchronization responses are broadcasted to multiple low-energy devices simultaneously.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
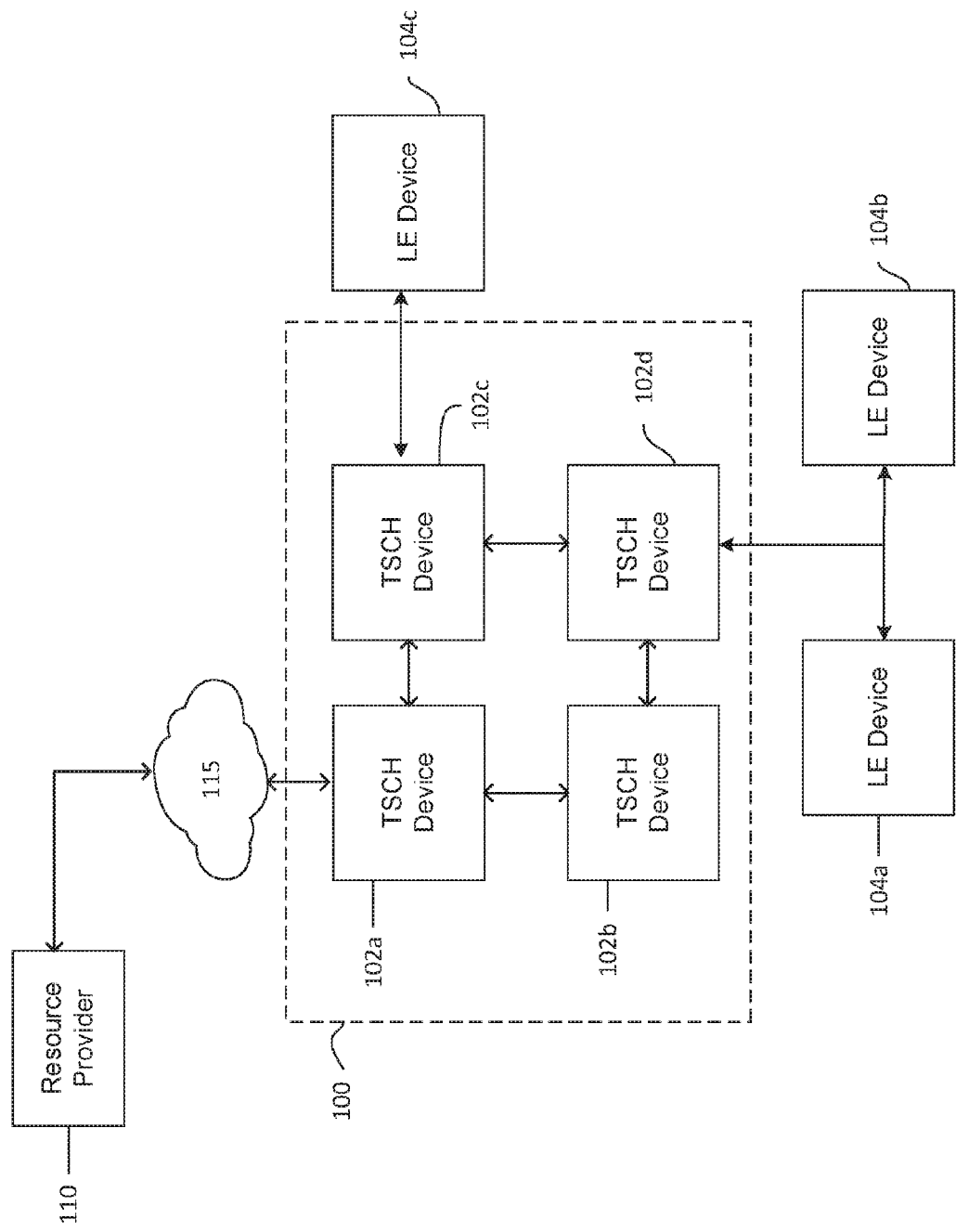
FIG. 1 is a network diagram illustrating example computing devices for implementing synchronized communications between parent devices operating on a primary time-slotted channel hopping (TSCH) network and connected low-energy devices operating on a low-energy TSCH protocol.

Systems and methods are provided for establishing synchronization between A/C powered parent devices operating on a primary time-slotted channel hopping (TSCH) network and low-energy endpoint devices (LE devices) that are battery powered and operating on a low-energy channel hopping protocol. The primary TSCH network includes, for example, multiple TSCH devices in a mesh network that provide communications with a resource provider system. The TSCH devices communicate using the TSCH protocol, defined by IEEE 802.15.4. By communicating using a TSCH protocol, nodes within the TSCH network transmit and receive signals using a series of time slots according to a scheduled frequency channel hopping pattern. LE devices are communicatively coupled to one or more TSCH parent devices. To conserve battery life, LE devices communicate with TSCH parent devices during wake periods of a wake/sleep cycle. Further, the LE devices operate on a low-energy channel hopping protocol, which is a secondary TSCH protocol in which the LE devices switch frequency channels at a rate slower than the frequency channel hopping pattern of the primary TSCH network. Embodiments described herein provide a synchronization mechanism for LE devices to synchronize with the channel hopping protocol of the primary TSCH parent device upon waking up from a sleep interval.

To synchronize communications with the LE device, the TSCH parent device is configured to communicate with adjacent TSCH nodes and listen for communications from LE devices during the same TSCH timeslot on the primary TSCH network. In the TSCH protocol, there may be instances when there is unused time within a timeslot. By subdividing the timeslot, the parent TSCH node operates on multiple channel assignments within the same timeslot. For example, the TSCH parent device may communicate with adjacent TSCH nodes during a primary portion of a TSCH timeslot. During the primary portions of the TSCH timeslots, the TSCH parent devices communicates with adjacent TSCH devices on frequency channels in accordance with the channel hopping pattern for the primary TSCH protocol. During a secondary portion of the TSCH timeslot, the TSCH parent device listens for communications from the LE device on the low-energy network frequency channel in accordance with the low-energy network channel hopping pattern.

In an example embodiment, to establish synchronization between the LE device and the channel hopping pattern of the TSCH parent device, the LE device, upon waking up from a sleep interval, transmits a synchronization request signal to the TSCH parent device. The synchronization request transmitted on a low-energy network frequency channel in accordance with the low-energy channel hopping protocol (i.e. the secondary TSCH protocol) implemented by the LE device. The TSCH parent device, listening for communications from the LE device during a secondary portion of the TSCH timeslot, receives the synchronization request. In response, the TSCH parent device transmits a synchronization response to the LE device during a subsequent timeslot. For example, the TSCH parent device may transmit the synchronization response during the next available timeslot, which is the next timeslot not reserved for other communications (e.g., generally within two or three timeslots subsequent to receiving the synchronization request). The synchronization response includes synchronization data that allows the LE device to synchronize its communications with the channel hopping pattern of the primary TSCH protocol. For example, the synchronization data includes an indication of the channel hopping pattern used in the primary TSCH protocol (e.g., timeslot and TSCH frame timing and frequency channel assignments per timeslot). The synchronization data may also include the Sync Period information, which is the duration information for the sleep/wake cycle, and the Absolute Slot Number (ASN) used by the LE device to realign its timeslots. The synchronization data may also include flags to indicate to the LE device that there is a pending packet to be transmitted to the LE device.

In additional embodiments, the TSCH parent device is configured to periodically transmit a synchronization response to connected LE devices. In these embodiments, the TSCH parent device does not wait to receive a synchronization request from the LE device, but instead periodically transmits a synchronization response to the LE device. If multiple LE devices are connected to the parent device, the parent device may transmit synchronization responses to each LE device during separate timeslots or broadcast the synchronization responses simultaneously. In such embodiments, the LE devices are configured to wake from a sleep cycle at specific intervals in order to receive the synchronization responses. The synchronization responses are transmitted by the parent devices on the corresponding low-energy network frequency channel in accordance with the low-energy channel hopping protocol implemented by the LE device. As explained above, the synchronization responses include synchronization data that allow the LE devices to synchronize communications with the faster channel hopping pattern of the primary TSCH protocol.

These illustrative examples are given to introduce the reader to the general subject matter discussed here and are not intended to limit the scope of the disclosed concepts. The following sections describe various additional aspects and examples with reference to the drawings in which like numerals indicate like elements.

Referring now to the drawings, FIG. 1 is a network diagram illustrating an example primary TSCH network 100 comprising TSCH devices 102a-d communicatively coupled to a resource provider 110. The primary TSCH network 100 provides communications between LE devices 104a-c and the resource provider 110. The primary TSCH network 100 provides communications between LE devices 104a-c and the resource provider 110 via network 115. For example, network 115 may include any suitable network or intermediary computing devices, including intranets or the Internet.

The LE devices 104a-c can be used to perform one or more applications relating to managing, monitoring, or otherwise using information regarding one or more attributes of a power distribution system associated with the resource provider 110. Non-limiting examples of such LE devices 104a-c include an intelligent metering device for monitoring and analyzing power consumption, a programmable thermostat for managing power consumption, an in-home display device for displaying information related to power consumption and associated billing information for the power consumption, and the like. LE devices 104a-c also include other Internet-Of-Things enabled devices for providing smart home capabilities in a home area network.

The TSCH devices 102a-c may be powered by standard A/C power. TSCH devices 102a-c may also be Mains powered and/or have a battery backend or a supercapacitor backend so that in a power failure the primary TSCH network 100 will remain operational for a duration allowable by the backup. The TSCH devices 102a-d communicate by operating on a TSCH protocol. In contrast, the LE devices 104a-c are powered by a power source that is limited in the capability for sustained power usage but instead provides enough power for bursts of communication, allowing LE devices 104a-c to communicate for synchronization, RIT command responses, unsolicited push messages, and other burst communications. LE devices 104a-c may also use alternative sources of low power application. For example, LE devices 104a-c may be powered by vampire tapping power, power harvesting, and other methods where powering applications for sustained periods is limited. LE devices 104a-c are configured to conserve battery life/energy usage by periodically shutting down power to components (e.g., oscillators and transceivers) and thus cycle between a sleep state and a wake state. LE devices 104a-c communicate with each other by operating on a secondary network that utilizes a low-energy TSCH protocol. The secondary network is also referred to herein as a low-energy TSCH network (LE-TSCH network). The channel hopping pattern used by the LE-TSCH network is referred to as a low-energy channel hopping pattern, in which frequency channels change at a slower rate than in the channel hopping pattern for the TSCH protocol used by the primary TSCH network. The LE devices 104a-c are communicatively coupled to the TSCH parent devices of the primary TSCH network 100. For example, TSCH device 102d is a parent device for LE devices 104a and 104b. TSCH device 102c is a parent device for LE device 104c.

In aspects disclosed herein, the parent TSCH devices 102c-d implements concurrent MAC on a single interface and can communicate with both the adjacent TSCH devices (e.g., TSCH devices 102b-c being adjacent to TSCH device 102d and TSCH devices 102b, 102d being adjacent to TSCH device 102c) and connected LE devices 104a-c via a single radio transceiver. In some other embodiments concurrent MAC can be implemented on more than one interfaces.

Figure 2:
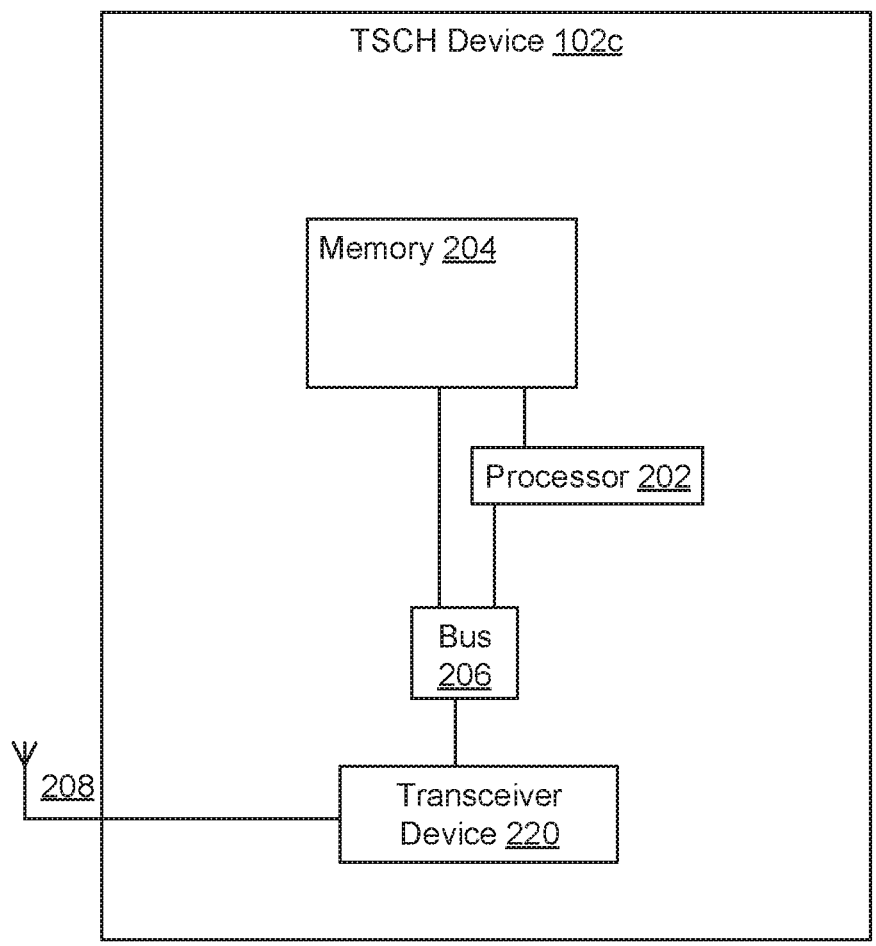
FIG. 2 is a block diagram illustrating an example of a TSCH parent device, according to embodiments disclosed herein.

FIG. 2 is a block diagram illustrating an example of a TSCH device 102 with a single transceiver device 220 for communicating with both adjacent TSCH devices and a connected LE device. The TSCH device 102 includes a processor 202. Non-limiting examples of the processor 202 include a microprocessor, an application-specific integrated circuit (ASIC), a state machine, a field programmable gate array (FPGA) or other suitable processing device. The processor 202 can include any number of processing devices, including one. The processor 202 can be communicatively coupled to non-transitory computer-readable media, such as memory device 204. The processor 202 can execute computer-executable program instructions and/or access information stored in the memory device 204.

The memory device 204 can store instructions that, when executed by the processor 202, causes the processor 202 to perform operations described herein. The memory device 204 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The TSCH device 102 can also include a bus 206. The bus 206 can communicatively couple one or more components of the TSCH device 102. Although the processor 202, the memory device 204, and the bus 206 are respectively depicted in FIG. 2 as separate components in communication with one another, other implementations are possible. For example, the processor 202 the memory device 204, and the bus 206 can be respective components of respective printed circuit boards or other suitable devices that can be disposed in TSCH device 102 to store and execute programming code.

The TSCH device 102 also includes a transceiver device 220 communicatively coupled to the processor 202 and the memory device 204 via the bus 206. Non-limiting examples of a transceiver device 220 include an RF transceiver and other transceivers for wirelessly transmitting and receiving signals. The transceiver device 220 is capable of handling concurrent MAC implemented on single or more interfaces to communicate with both adjacent TSCH devices 102a, 102d and a connected LE device 104c via antenna 208. For example, the TSCH device 102 communicates with adjacent TSCH devices on the primary network and the LE device 104 on the secondary network using the same antenna 208 for multiple MAC interfaces handled by the transceiver device 220. In some aspects, the TSCH device 102 communicates with adjacent TSCH devices on the primary network and the LE device on the secondary network on a common frequency band.

Figure 3:
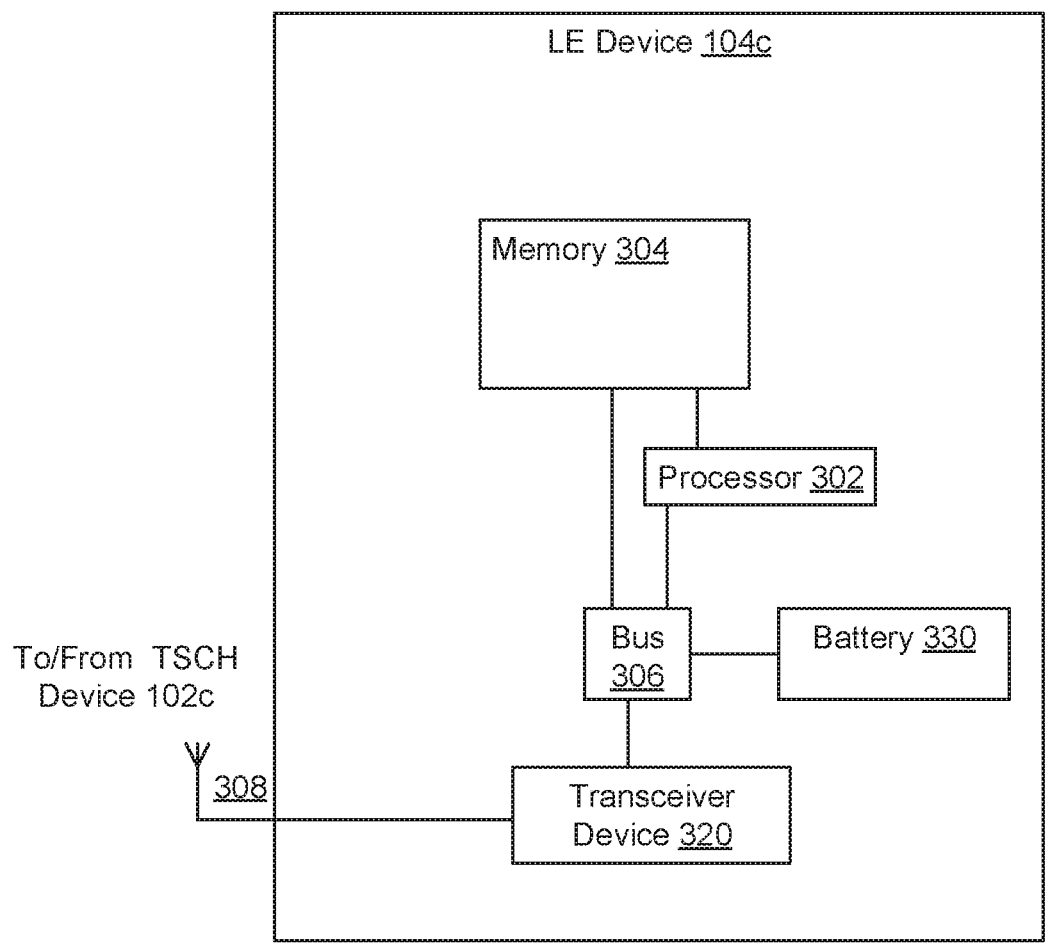
FIG. 3 is a block diagram illustrating an example of a low-energy endpoint device, according to embodiments disclosed herein.

FIG. 3 is a block diagram illustrating an example of a LE device 104c for communicating with parent TSCH device 102c. The LE device 104c includes a processor 302, memory 304, transceiver device 320, all interconnected via bus 306. Processor 302, memory 304, transceiver device 320, and bus 306 perform operations similar to those described above with respect to FIG. 2. Additionally, as LE device 104c is battery powered, the memory 304, processor 302, bus 306, and transceiver device 320 are powered by a battery 330.

As mentioned above, the TSCH network 100 utilizes a TSCH protocol to communicate wireless information within the network and outside the network. In a TSCH network, devices within the network are synchronized according to a TSCH channel hopping pattern. To communicate with both adjacent TSCH devices 102b, 103d and a connected LE device 104 (operating on a low-energy channel hopping protocol), the TSCH devices 102 can alternate communication periods between the TSCH network 100 and the connected LE device 104c by sub-dividing TSCH timeslots used in the primary TSCH network 100.

Figure 4:
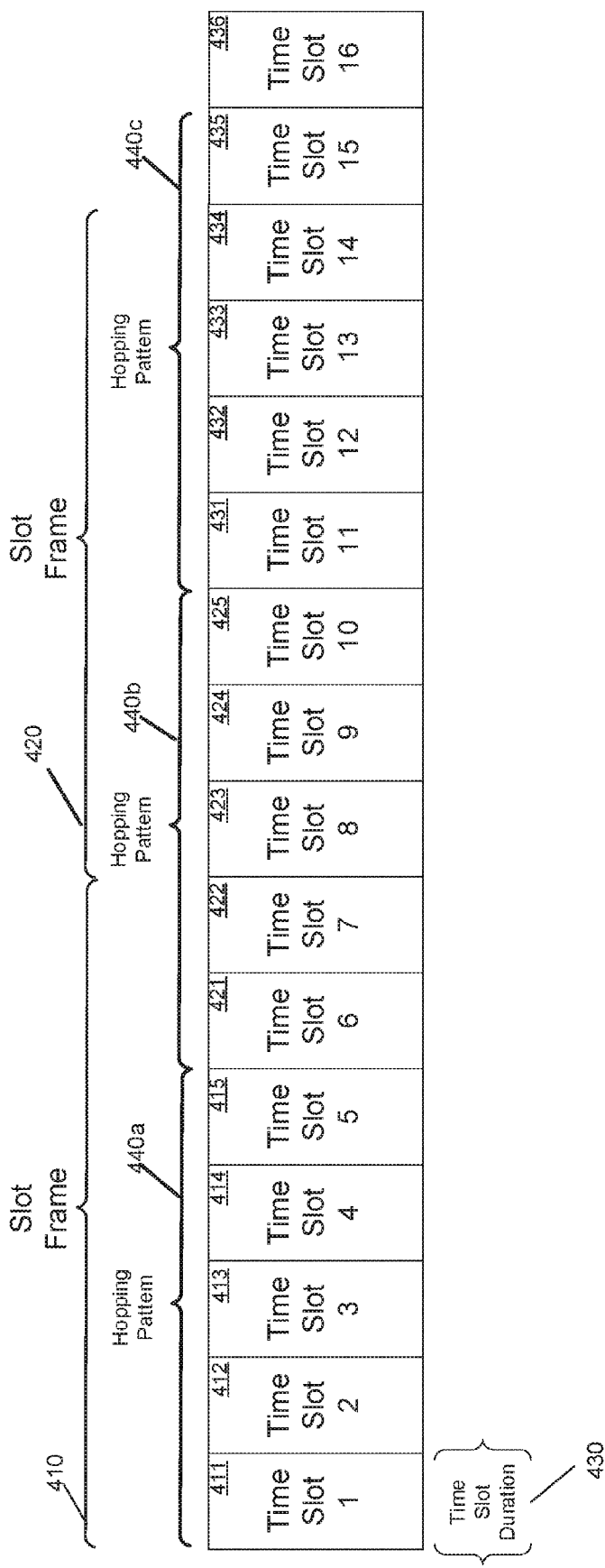
FIG. 4 is a is a diagram illustrating the arrangements of timeslots in a time slotted channel hopping pattern.

Each timeslot in a primary TSCH network 100 is of a time duration of duration "T" which can be defined in milliseconds or other appropriate time unit. A TSCH network also uses multiple channel frequencies for communication between devices in the network. A hopping pattern defines the channel used to communicate during each timeslot. FIG. 4 is a diagram illustrating timeslots and channel hopping pattern for the primary TSCH network 100 following a TSCH protocol. FIG. 4 illustrates timeslots 411-415, 421-425, and 431-436, each with the same timeslot duration 430. As an example, timeslot duration 430 can be 25 milliseconds. Each slot frame 410 and 420 includes seven timeslots. FIG. 4 also illustrates the channel hopping pattern 440 (shown as channel hopping patterns 440a-c). A channel hopping pattern defines a channel frequency or channel for each timeslot in the hopping pattern. For example, the hopping pattern 440a may be channel 4, channel 6, channel 3, channel 5, channel 7, i.e., it may associate channel 4 with timeslot 1, channel 6 with timeslot 2, channel 3 with timeslot 3, channel 5 with timeslot 4, and channel 7 with timeslot 5. In FIG. 4 the hopping pattern 440a has a hopping pattern length of 5. The hopping pattern repeats. The first illustrated iteration of the hopping pattern 440a contains timeslots 1-5 (411-415), the second iteration of the hopping pattern 440b contains timeslots 6-10 (416-420), and the third iteration of the hopping pattern 440c contains timeslots 11-15 (421-425). The number of timeslots in a hopping pattern is independent of the number of timeslots in a slot frame.

While TSCH devices 102a-d communicating using a TSCH protocol change channel frequencies every timeslot duration 430 (e.g., every 25 milliseconds), LE devices 104a-c operate on a low-energy channel hopping protocol that is a low-energy TSCH protocol, where channel frequencies change at a slower rate than the channel hopping pattern of the primary TSCH network 100. For example, LE devices 104a-c may change channel frequencies every 1,024 timeslots (i.e. for a 25 millisecond timeslot, LE devices 104a-c may switch to a different channel every 25.6 seconds).

The parent devices 102c, 102d determine the parameters of the low-energy channel hopping pattern to be utilized by the connected LE devices 104a-c. The parent devices 102c, 102d communicate the low-energy channel hopping patterns to any connecting LE device 104a-c. For example, when LE devices 104a-c first join and connect to a TSCH parent device 102c, 102d, the parent device 102c, 102d communicates the respective low-energy channel hopping pattern used in the LE-TSCH network to the LE devices 104c, 104a-b. The LE devices 104a-c store in memory indications of the channel hopping patterns of the parent devices 102c-d. Accordingly, the TSCH parent devices 102c, 102d are able to switch to the appropriate low-energy channel to communicate with the LE devices 104a-c on the corresponding low-energy channels. As mentioned above, the TSCH device 102c, 102d sub-divides TSCH timeslots to communicate with both adjacent TSCH devices and with connected LE devices. In some embodiments, the low-energy network channel hopping pattern used by LE devices 104a-c may be controlled by the TSCH devices 102c, 102d. In other embodiments, each LE device 104a-c may operate an independent low-energy channel hopping pattern, in which case the parent devices 102c, 102d store in memory the low-energy channel hopping patterns of the different LE devices 104a-c (e.g., TSCH device 102d stores in memory the different channel hopping patterns operated by LE device 104a and LE device 104b).

Figure 5:
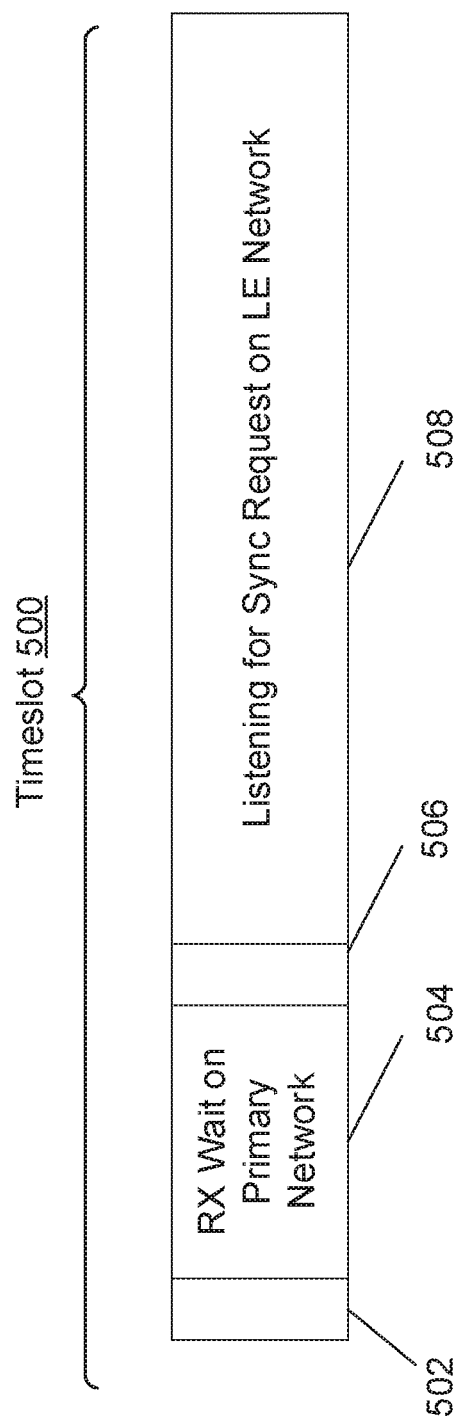
FIG. 5 is a diagram illustrating an example of one of the timeslots shown in FIG. 4.

FIG. 5 illustrates a TSCH timeslot structure for timeslot 500 according to embodiments herein. In this example, the time periods shown are exemplary and other values may be used in other implementations. For example, timeslot 500 may be of a duration of 25 milliseconds, but other periods of a timeslot are also possible). In the TSCH timeslot structure, a TSCH device 102 in the TSCH network listens on a channel determined by the TSCH hopping pattern during a primary portion of the timeslot 504. As shown in FIG. 5, after an RF settle period 502, the device can listen for receive signals on a channel for a first period of time (shown as RX wait time 504, (e.g., for 4 milliseconds). If the TSCH device 102 receives a message prior to the expiration of the RX wait time 504, then the device can proceed to receive the rest of the message for the duration of the timeslot 500 and process the received message. However, if the device does not receive a message prior to the expiration of the RX wait time 504, then the device may determine that it will not receive a communication from another device on the primary network during the present timeslot.

Following a second RF settle period 506, the TSCH device 102 listens for communications from a connected LE device during a secondary portion of the TSCH timeslot 508. In this example, the secondary portion of the TSCH timeslot 508 is for 17 milliseconds. The TSCH device 102 listens for synchronization requests from a connected LE device 104. As the LE device 104 may be communicating on a different frequency channel than the channel used for TSCH timeslot 500 (according to the TSCH channel hopping pattern), the TSCH device 102 switches channel frequencies during the secondary portion of the timeslot 508 to listen for communications on the corresponding low-energy network channel. The TSCH device 102 identifies the correct channel frequency to listen for communications on the low-energy network channel based on the low-energy channel hopping pattern.

Once the TSCH device 102 receives the synchronization request, the TSCH device 102 transmits a synchronization response on the primary portion of the timeslot on the low-energy network channel. The synchronization request includes the synchronization data that enables the LE device 104 to synchronize with the faster channel hopping pattern of the primary TSCH network 100.

Figure 6:
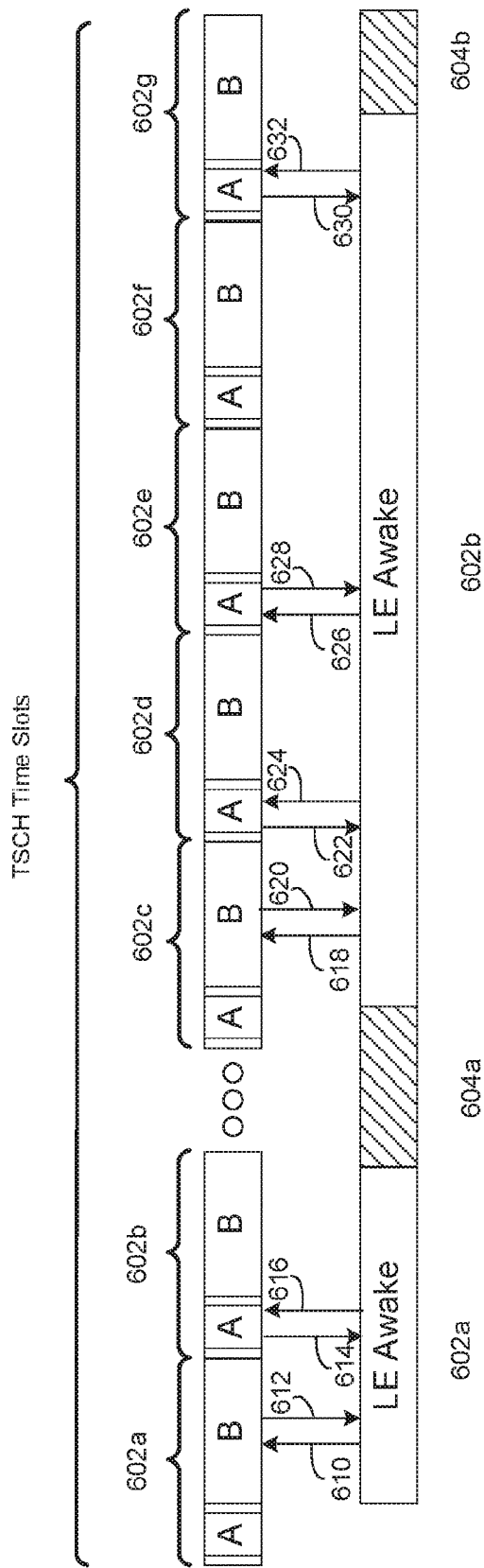
FIG. 6 is a timing diagram illustrating an example of the communication between a TSCH parent device and a low-energy endpoint device for establishing synchronization.
Figure 7:
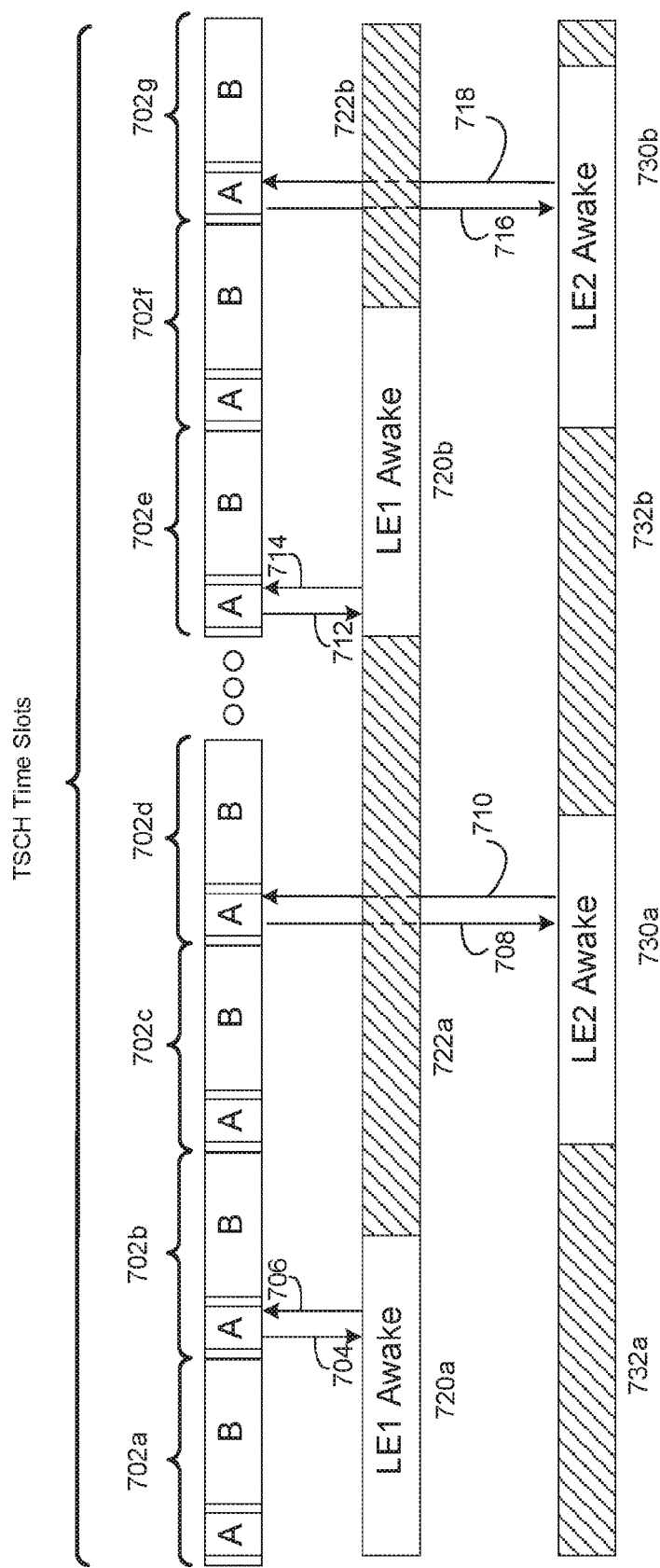
FIG. 7 is a timing diagram illustrating an alternate example of the communication between a TSCH parent device and a low-energy endpoint device for establishing synchronization.
Figure 8:
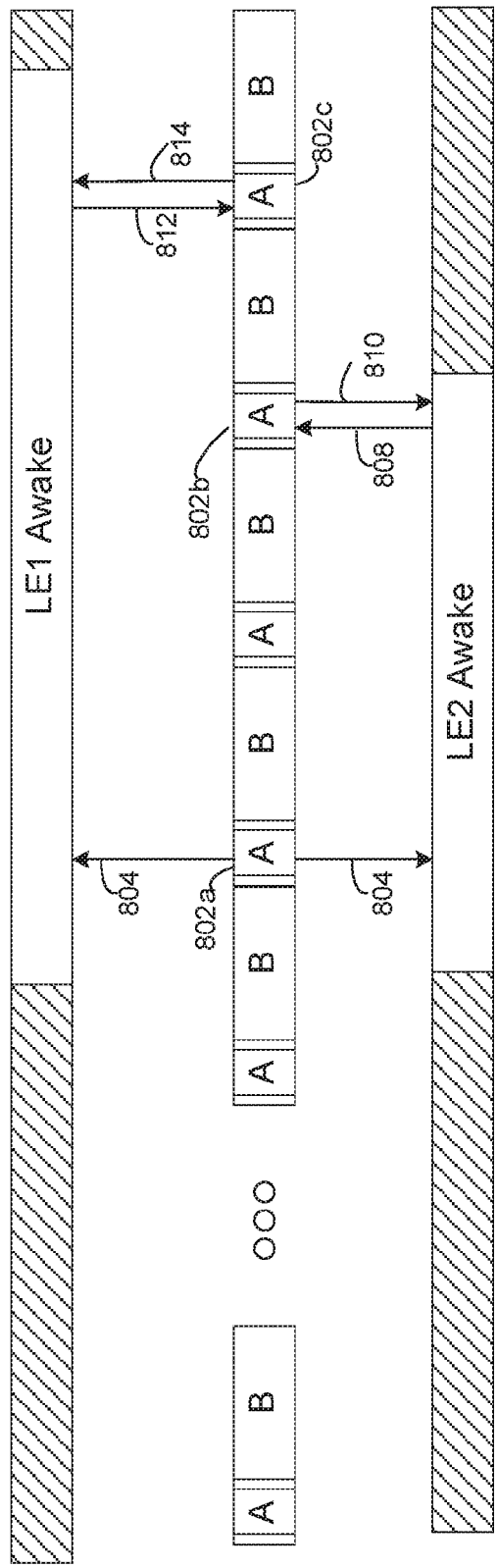
FIG. 8 is a timing diagram illustrating an alternate example of the communication between a TSCH parent device and a low-energy endpoint device for establishing synchronization by utilizing broadcast synchronization responses.

FIGS. 6-8 illustrate timing diagrams and for different embodiments in which a parent TSCH device 102 synchronizes communications with an LE device 104. For example, FIG. 6 demonstrates the synchronization sequence in an embodiment where the LE device 104 initiates the synchronization via a synchronization request. FIG. 6 depicts TSCH timeslots 602a-602g, each timeslot sub-divided into a primary portion (shown as "A") and a secondary portion (depicted as "B"). FIG. 6 also depicts a wake/sleep cycle for LE device 104. For example, FIG. 6 depicts LE device 104 as being in wake states 602a-b and in sleep states 604a-b. During a wake state 602, the LE device 104 is fully powered and can transmit and receive communications with the parent TSCH device 102. During sleep states 604a-b, the LE device 104 has powered down components for battery preservation (e.g., oscillators, transceivers). The LE device 104 can transmit and receive communicates during the wake states 602*a-b*. Note that the timing shown in FIG. 6 for the wake states 602*a-b* and sleep states 604*a-b* is shown for example purposes only and is not intended to be limiting. The timing duration of a wake state 602 and a sleep state 604 can include any suitable length of time.

To begin the synchronization process, during a wake state 602*a*, the LE device 104 transmits a synchronization request 610 to the connected parent TSCH device 102 on a low-energy network channel. As discussed above, the TSCH device 102 listens for communications from the LE device 104 during the secondary portion of the TSCH timeslot 602*a*. The TSCH device 102 listens for communications on the low-energy network channel.

Upon receiving the synchronization request 610, the parent TSCH device 102 responds by transmitting an acknowledgment signal 612 to the LE device 104. The acknowledgment signal 612 may be transmitted as a MAC layer acknowledgment within a defined time interval. The acknowledgment signal 612 indicates to the LE device 104 that the parent TSCH device 102 received the synchronization request 610. In some instances, the parent TSCH device 102 may not receive the synchronization request as the TSCH device 102 be communicating with an adjacent TSCH device or engaged in other processing during the secondary portion of timeslot 602*a*. Upon failure of receiving an acknowledgment signal 612 after a defined interval of time, the LE device 104 re-transmits the synchronization request 610 during a subsequent timeslot.

During the primary portion of timeslot 602*b*, TSCH device 102 transmits a synchronization response 614. Because the LE device 104 is operating on a low-energy network channel according to a low-energy channel hopping pattern, the TSCH device 102 transmits the synchronization response 614 on the low-energy network channel (i.e. the same channel in which the TSCH device 102 received the synchronization request 610). The synchronization response 614 includes synchronization data allowing the LE device 104 to synchronize with the channel hopping pattern of the TSCH network 100. Synchronization data may include, for example, information on the duration of the TSCH timeslots, the channel hopping pattern of the TSCH protocol, identification of the frequency channels for each timeslot, etc. In some embodiments, the synchronization data includes an absolute slot number identifier for identifying the subsequent timeslot for communicating with the parent TSCH device 102.

Similar to the use of acknowledgment signal 612, upon transmitting the synchronization response 614, the parent TSCH device 102 listens for an acknowledgment signal 616 from the LE device 104. The acknowledgment signal 616 indicates to the TSCH device 102 whether the parent LE device 104 received the synchronization response 614. Upon failure of receiving an acknowledgment signal 616 after a defined interval of time, the TSCH device 102 re-transmits the synchronization response 614 during a subsequent timeslot.

Upon exiting from a sleep state and entering a wake state, the LE device 104 re-establishes synchronization with the TSCH network 100 by initiating a synchronization request as described above. FIG. 6 further depicts synchronization signaling similar to that described above via synchronization request 618 from the LE device 104, acknowledgment signal 620 from the TSCH device 102, synchronization response 622 from the TSCH device 102, and acknowledgment signal 624 from the LE device 104.

The acknowledgment signals 616, 624 may indicate, to the TSCH device 102, that the LE device 104 is synchronized to the channel hopping pattern of the TSCH protocol. When the LE device 104 is synchronized, the LE device 104 communicates by operating on the channel hopping pattern of the TSCH protocol (i.e. the channel hopping pattern used by the parent TSCH device 102). While the LE device 104 is synchronized with the channel hopping pattern of the TSCH protocol, the TSCH device 102 and LE device 104 may communicate on the primary portions of subsequent timeslots on the frequency channel according to the primary TSCH channel hopping pattern. As such, synchronizing communications of the LE device 104 with the channel hopping pattern of the TSCH protocol used by the primary TSCH network 100 causes the LE device 104 to switch channels at the faster rate of the primary TSCH protocol in unison with the primary TSCH network 100.

For example, FIG. 6 depicts that LE device 104 transmits message data 626 (e.g., any data relating to operation of the home area network serviced by the LE device 104 or relating to the operation of the resource provider 110) to TSCH device 102 during the primary portion of timeslot 602*e*. The message data 626 is transmitted by the LE device 104 on the appropriate frequency channel according to the channel hopping pattern of the TSCH protocol (i.e. the channel hopping pattern utilized by the parent TSCH device 102). Upon receiving the message data 626, the TSCH device 102 transmits an acknowledgment signal 628 confirming receipt of the message data 626.

Once the LE device 104 is synchronized with the TSCH device 102, the TSCH device 102 can also transmit message data 630 (e.g., any data relating to the operation of the home area network serviced by the LE device 104 or the operation of the resource provider 110, or instructions to the LE device 104) to LE device 104. As the LE device 104 is synchronized with the channel hopping pattern of the TSCH protocol, the message data 630 is transmitted on the primary portion of the TSCH timeslot 602*g* on the frequency channel according to the TSCH channel hopping pattern used by the primary TSCH network 100. Upon receiving the message data 630, the LE device 104 transmits an acknowledgment signal 632 confirming receipt of the message data 630.

In additional embodiments, the LE device 104 may be configured to listen for synchronization responses from its connected parent TSCH device 102 at defined intervals of time. In these embodiments, the TSCH device 102 periodically transmits a synchronization response at the defined intervals of time without first requiring a synchronization request from the LE device 104. Such embodiments help in further conserving battery life of the LE device 104.

FIG. 7 depicts a timing diagram for a TSCH device 102*d* synchronizing with communications of two connected LE devices 104*a*, 104*b*. The TSCH device 102*d* communicates on TSCH timeslots 702*a-g*. The first LE device 104*a* operates on a sleep/wake cycle shown as wake states 720*a-b* and sleep states 722*a-b*. Similarly, the second LE device 104*b* operates on a sleep/wake cycle shown as wake states 730*a-b* and sleep states 732*a-b*. Each LE device 104*a-b* operates using a low-energy channel hopping protocol. The low-energy channel hopping protocol utilized by LE device 104*a* may be the same or different as the low-energy channel hopping pattern utilized by LE device 104*b*. In the embodiment shown in FIG. 7, the LE devices 104*a-b* are configured to listen for synchronization responses from the connected TSCH parent device 102*d* at defined intervals. For example, the defined intervals may be set during initial network joining of the LE devices 104a-b or during initial network installation.

To begin synchronizing the communications of the LE devices 104a-b with the faster channel hopping pattern of the TSCH protocol of the primary TSCH network 100, the TSCH device 102d transmits a synchronization response 704 to LE device 104a. The synchronization response 704 includes similar information as discussed above with respect to FIG. 6. The synchronization response 704 is transmitted on the low-energy network channel according to the low-energy channel hopping pattern utilized by the LE device 104a. The TSCH device 102d then listens for an acknowledgment signal 706 from the LE device 104a, the acknowledgment signal indicating that the LE device 104a received the synchronization response and synchronized with the channel hopping protocol of the TSCH network 100.

Similarly, the TSCH device 102d transmits synchronization response 708 to LE device 104b. The synchronization response 708 includes similar information as described above and is transmitted on the low-energy network channel according to the low-energy channel hopping protocol utilized by the LE device 104b. The TSCH device 102d then listens for an acknowledgment signal 706 from the LE device 104b, the acknowledgment signal indicating that the LE device 104b received the synchronization response and synchronized with the channel hopping protocol of the primary TSCH network 100.

Once the LE devices 104a-b enter a sleep state, the synchronization of the LE devices 104a-b with the TSCH channel hopping pattern used by the primary TSCH network 100 may be lost and the TSCH devices 104a-b may return to their respective low-energy network hopping patterns. During the next wake states (i.e. wake state 720b and wake state 730b), LE devices 104a-b again listen for synchronization responses from parent TSCH device 102d. For example, during timeslot 702e, TSCH device 102d transmits a synchronization response 712 to LE device 104a and waits for an acknowledgment signal 714. Similarly, during timeslot 702g, TSCH device 102d transmits a synchronization response 716 to LE device 104b and waits for acknowledgment signal 718.

Once LE devices 104a-b are synchronized, parent TSCH device 102d and LE devices 104a-b may communicate by transmitting messages on frequency channels defined by the TSCH channel hopping protocol used by the primary TSCH network 100, as discussed above with respect to FIG. 6.

In some embodiments, instead of transmitting the synchronization response to individual LE devices during different timeslots, the TSCH device 102 may broadcast a synchronization response to multiple LE devices substantially simultaneously during the same timeslot. FIG. 8 depicts an example timing diagram for a TSCH device 102d establishing synchronization with connected LE devices 104a-b by broadcasting synchronization response 804 to LE devices 104a, 104b, respectively. In response, LE devices 104a-b transmit synchronization acknowledgment messages 808, 812 to the TSCH device 102d, indicating that the LE devices 104a-b successfully received the broadcast synchronization response 804 and that the LE devices 104a-b have synchronized to the channel hopping pattern of the TSCH protocol used by the TSCH network 100. So that the synchronization acknowledgment messages 808, 812 do not interfere with each other, they are transmitted at randomized slot offsets. The randomized slot offsets, calculated by the LE devices 104a-b, specify the timeslots in which the LE devices 104a-b should transmit the synchronization acknowledgment messages 808, 812. For example, synchronization acknowledgment message 808 is transmitted by LE device 104b at the primary portion of timeslot 802b and synchronization acknowledgment message 812 is transmitted by LE device 104a at the primary portion of timeslot 802c. The synchronization acknowledgment messages 801, 812 are transmitted on the corresponding frequency channel according to the channel hopping pattern of the TSCH protocol implemented by the parent TSCH device 102d.

In additional embodiments, the parent TSCH device 102 attempts to synchronize with connected LE devices 104 according to methods described above with respect to FIG. 7 (passive synchronization without requiring synchronization requests) and FIG. 8 (broadcast synchronization wherein synchronization responses are transmitted to multiple LE devices simultaneously) for predefined synchronization interval periods. For example, a parent TSCH device 102 may be configured during initialization to attempt to synchronize with connected LE devices periodically for a predefined interval period (i.e. a predefined number of timeslots). The LE device 104 may be configured during initialization to listen, during wake states, for synchronization responses from LE device 104 for the predefined interval period. If the LE device 104 does not receive a synchronization response during the predefined interval period, the LE device 104 can be configured to transmit synchronization requests to the TSCH device 102 and initiate synchronization as described above with respect to FIG. 6.

Figure 9:
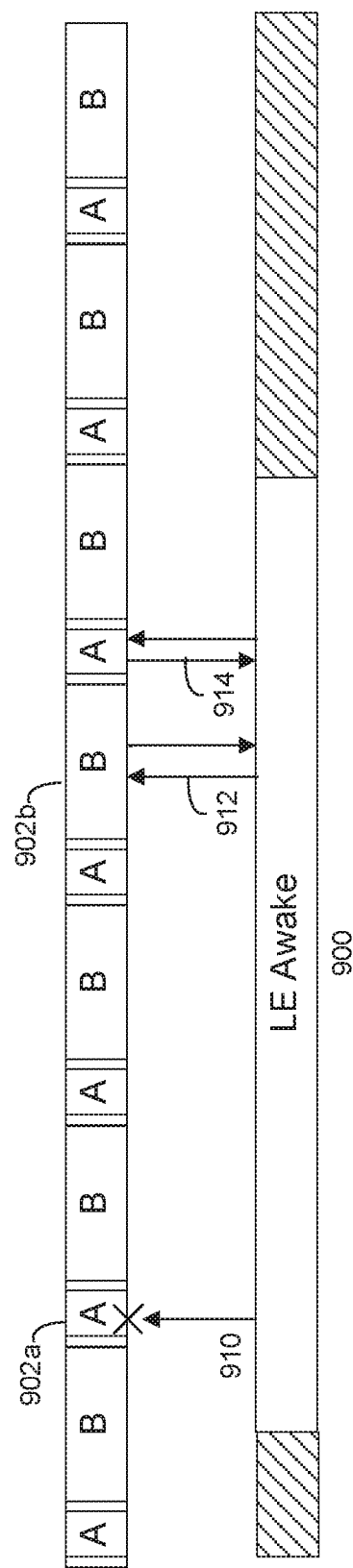
FIG. 9 is a timing diagram illustrating an example communication between a TSCH parent device and a low-energy endpoint device for re-attempting synchronization upon a failed synchronization attempt.

In additional embodiments, if the LE device 104 fails to receive an acknowledgment message from the TSCH device 102 in response to a synchronization request, the LE device 104 can retransmit the synchronization request. FIG. 9 depicts a timing diagram where an LE device 104 transmits a synchronization request 910 to a TSCH device 102 during the primary portion of timeslot 902a. As discussed above, the TSCH device 102 is configured to listen for communications (i.e. synchronization requests) from LE device 104 during the secondary portion of TSCH timeslots. As the synchronization request was transmitted during the primary portion of timeslot 902a, the TSCH device 102 may not receive the synchronization request and not provide an acknowledgment signal. After a predefined interval period, the LE device 104 may retransmit the synchronization request 912 during a subsequent timeslot 902b by adding a timing offset. The timing offset may cause the synchronization request 912 to be received by the TSCH device 102 during a secondary period of the TSCH timeslot 902b (during which the TSCH device 102 is listening for communications from the LE device 104). Upon receiving the synchronization request 912, the TSCH device 102 transmits an acknowledgment signal followed by a synchronization response 914, as discussed above with respect to FIG. 6. The synchronization response 914 provides the synchronization data to allow the LE device 104 to synchronize communications with the channel hopping pattern of the TSCH device 102.

Figure 10:
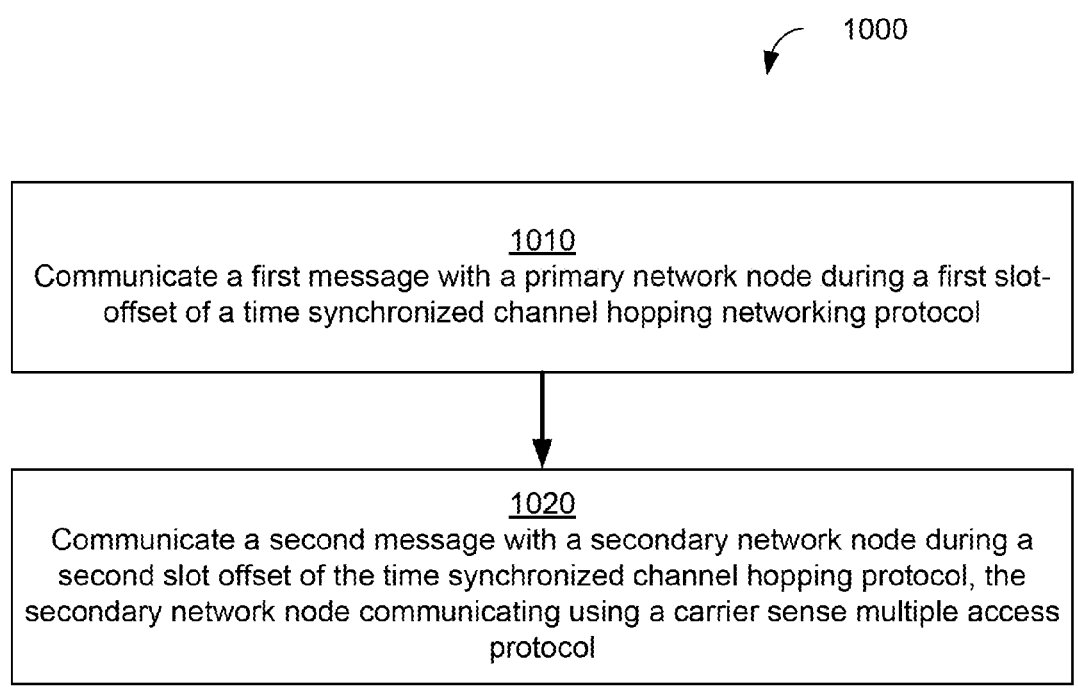
FIG. 10 is a flowchart depicting an example process for establishing synchronization between a TSCH parent device and a low-energy endpoint device.

FIG. 10 is a flowchart illustrating an example method 1000 for synchronizing communications between an LE device 104 operating on a low-energy channel hopping protocol and a TSCH device 102 operating on a TSCH protocol. For illustrative purposes, the method 1000 is described with reference to the system implementations depicted in FIGS. 1-3 and with regards to the TSCH timeslot illustrations shown in FIGS. 4-6. Other implementations, however, are possible.

As shown in block 1010, the process 1000 includes, during a secondary portion of a first timeslot of a TSCH protocol, receiving a synchronization request from a low-energy endpoint device communicating on a low-energy network channel. For example, a TSCH device 102 subdivides TSCH timeslots to communicate with other devices on the TSCH network during a primary portion of the TSCH timeslot (i.e. utilizing the frequency channel in accordance with the channel hopping pattern of the TSCH protocol) and to listen for communications from connected LE devices 104 during a secondary portion of the TSCH timeslot. The synchronization request (and corresponding synchronization response from the TSCH device) can be provided by adding an information element in the application layer data packet.

The process 1000 further includes transmitting, by the parent TSCH device 102 to the low-energy endpoint device 104, a synchronization response during the primary portion of a second timeslot, as shown in block 1020. The synchronization response is transmitted on the low-energy network channel utilized by the LE device 104 (i.e. the same frequency channel upon which the synchronization request was received). The synchronization response includes synchronization data for synchronizing the communications of the low-energy endpoint device with the channel hopping pattern of the TSCH protocol. By synchronizing with the channel hopping pattern of the primary TSCH protocol, the LE device 104 changes its channel hopping pattern while in the wake state to switch channels in accordance with faster channel hopping rate of the TSCH protocol used by the primary TSCH network 100.

Once synchronized, the TSCH parent device may communicate message data with the LE device during the primary portion of TSCH timeslots on frequency channels according to the TSCH protocol used by the primary TSCH network 100.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

Further, while the embodiments disclosed herein are described with respect to TSCH devices that are A/C powered and LE devices that are battery powered, it should be understood that these embodiments are provided for purposes of example rather than limitation. Embodiments disclosed herein do not preclude use of TSCH devices in a TSCH network that are powered by non-A/C sources and/or LE devices that are powered by non-battery sources of power.

The invention claimed is:

1. A method executed by a processor within a parent node operating on a primary time-slotted channel hopping (TSCH) network, the method comprising:
    listening on a primary TSCH channel, by the parent node, during a primary portion of a first timeslot of a plurality of timeslots of a primary TSCH protocol for a communication from a neighboring node on the primary TSCH network;
    when no communication is received during the primary portion of the first timeslot, then listening on a low-energy network channel, by the parent node, during a secondary portion of the first timeslot for a communication from a low-energy endpoint node wherein the primary TSCH channel and the low-energy network channel are distinct frequency channels;
    receiving, on the low-energy network channel, by the parent node, during the secondary portion of the first timeslot, a synchronization request from the low-energy endpoint node; and
    transmitting, by the parent node to the low-energy endpoint node, a synchronization response during the primary portion of a second timeslot of the plurality of timeslots of the primary TSCH protocol, the second timeslot subsequent to the first timeslot, wherein the synchronization response includes synchronization data for synchronizing communications of the low-energy endpoint node with a channel hopping pattern of the primary TSCH protocol.

2. The method of claim 1, wherein the parent node is powered by a non-battery source, wherein the low-energy endpoint node is powered by a battery source, and wherein the parent node receives communications from the low-energy endpoint node only during wake-up periods of a wake/sleep cycle of the low-energy endpoint node.

3. The method of claim 1, wherein the synchronization data comprises an absolute slot number identifier for identifying a third timeslot for communicating with the parent node.

4. The method of claim 1, further comprising:
    communicating, between the parent node and the low-energy endpoint node, during the primary portion of a third timeslot of the plurality of timeslots of the primary TSCH protocol, message data, the third timeslot subsequent to the second timeslot.

5. The method of claim 1, wherein the low-energy network node operates on a low-energy TSCH protocol, and wherein channel hopping for the primary TSCH protocol occurs at a faster rate compared to channel hopping of the low-energy TSCH protocol.

6. The method of claim 5, wherein synchronizing communications of the low-energy network node with the channel hopping pattern of the primary TSCH protocol causes the low-energy network node to switch channels at the faster rate of the primary TSCH protocol.

7. The method of claim 1, wherein the parent node communicates the synchronization response to the low-energy endpoint node on the low-energy network channel utilized by the low-energy endpoint node.

8. The method of claim 1, further comprising:
    listening for an acknowledgment signal from the parent node in response to the synchronization request, the acknowledgment signal indicating that the parent node received the synchronization request transmitted by low-energy end point; and
    upon determining that the acknowledgment signal was not received from the parent node, retransmitting the synchronization request.

9. A method, comprising:
    transmitting a first synchronization response from the parent node to a first low-energy endpoint node on a first low-energy network channel, the first synchronization response transmitted during a first wake-up period of a first wake/sleep cycle of the first low-energy endpoint node, wherein the parent node communicates with one or more adjacent nodes during a plurality of timeslots on one or more channels according to a channel hopping pattern of a primary time-slotted channel hopping (TSCH) protocol;

transmitting a second synchronization response from the parent node to a second low-energy endpoint node on a second low-energy network channel, the second synchronization response transmitted during a second wake-up period of a second wake/sleep cycle of the second low-energy endpoint node, wherein the first synchronization response and the second synchronization response include synchronization data for synchronizing with the channel hopping pattern of the primary TSCH protocol;

listening for a first acknowledgment signal from the first low-energy endpoint node in response to the first synchronization response, the first acknowledgment signal indicating that the first low-energy endpoint node received the first synchronization response and synchronized with the channel hopping pattern of the primary TSCH protocol; and listening for a second acknowledgment signal from the second low-energy endpoint node in response to the second synchronization response, the second acknowledgment signal indicating that the second low-energy endpoint node received the second synchronization response and synchronized with the channel hopping pattern of the primary TSCH protocol.

10. The method of claim 9, further comprising:
upon determining that the first acknowledgment signal was not received from the first low-energy endpoint node, retransmitting the first synchronization response during a subsequent timeslot.

11. The method of claim 9, wherein the first synchronization response is transmitted during a primary portion of a first timeslot of the primary TSCH protocol on the first low-energy network channel and the second synchronization response is transmitted during a primary portion of a second timeslot of the primary TSCH protocol on the second low-energy network channel.

12. The method of claim 9, wherein the parent node is powered by a non-battery source, wherein the first low-energy endpoint node and second low-energy endpoint node are powered by a battery source.

13. The method of claim 9, wherein the first low-energy network node and the second low-energy network node operate on a low-energy TSCH protocol, and wherein channel hopping for the primary TSCH protocol occurs at a faster rate compared to channel hopping of the low-energy TSCH protocol.

14. The method of claim 9, further comprising:
upon determining that the first acknowledgment signal was not received from the first low-energy endpoint node, listening, during a secondary portion of a timeslot of the primary TSCH protocol, for a synchronization request from the first low-energy endpoint node on the first low-energy network channel.

15. A method, comprising:
broadcasting a synchronization response from a parent node to a first low-energy endpoint node and to a second low-energy endpoint node on a low-energy network channel, the synchronization response transmitted during a first wake-up period of a first wake/sleep cycle of the first low-energy endpoint node and a second wake-up period of a second wake/sleep cycle of the second low-energy endpoint node, wherein the parent node communicates with one or more adjacent nodes during a plurality of timeslots on one or more channels according to a channel hopping pattern of a primary time-slotted channel hopping (TSCH) protocol;

listening for a first acknowledgment signal from the first low-energy endpoint node in response to the synchronization response, the first acknowledgment signal indicating that the first low-energy endpoint node received the synchronization response and synchronized with the channel hopping pattern of the primary TSCH protocol; and listening for a second acknowledgment signal from the second low-energy endpoint node in response to the synchronization response, the second acknowledgment signal indicating that the second low-energy endpoint node received the synchronization response and synchronized with the channel hopping pattern of the primary TSCH protocol.

16. The method of claim 15, wherein the synchronization response is broadcasted during a primary portion of a first timeslot of the plurality of timeslots of the primary TSCH protocol.

17. The method of claim 16, further comprising:
receiving, during a second timeslot of the plurality of timeslots of the primary TSCH protocol, the first acknowledgment signal, the second timeslot occurring according to a first randomized delay determined by the first low-energy endpoint node; and
receiving, during a third timeslot of the plurality of timeslots of the primary TSCH protocol, the second acknowledgment signal, the third timeslot occurring according to a second randomized delay determined by the second low-energy endpoint node.

18. The method of claim 15, further comprising:
upon determining that the first acknowledgment signal was not received from the first low-energy endpoint node, listening, during a secondary portion of a timeslot of the primary TSCH protocol, for a synchronization request from the first low-energy endpoint node on a low-energy network channel.

19. A system, comprising:
a plurality of nodes communicatively coupled to each other in a primary time-slotted channel hopping (TSCH) network, at least one of the plurality of nodes comprising a parent node, the parent node comprising:
a processor, and
a non-transitory computer-readable medium, wherein the processor is configured for executing instructions embodied in the non-transitory computer-readable medium to perform operations comprising:
receiving, by the parent node during a secondary portion of a first timeslot of a plurality of timeslots of a primary TSCH protocol, a synchronization request from a low-energy endpoint node communicating on a low-energy network channel, wherein the parent node communicates with one or more adjacent nodes during primary portions of the plurality of timeslots on one or more primary TSCH channels of the primary TSCH protocol, wherein the low-energy network channel and the primary TSCH channel associated with the first timeslot are distinct frequency channels, and wherein the parent node listens for communications on the low-energy network channel during the secondary portion of the first timeslot; and
transmitting, by the parent node to the low-energy endpoint node, a synchronization response during the primary portion of a second timeslot of the plurality of timeslots of the TSCH protocol, wherein the synchronization response includes synchronization data for synchronizing communications of the low-energy endpoint node with a channel hopping pattern of the TSCH protocol.

20. The system of claim 19, wherein the parent node is powered by a non-battery source, wherein the low-energy endpoint node is powered by a battery source, and wherein the parent node receives communications from the low-energy endpoint node only during wake-up periods of a wake/sleep cycle of the low-energy endpoint node.

21. The system of claim 19, wherein the low-energy network node operates on a low-energy TSCH protocol, and wherein channel hopping for the primary TSCH protocol occurs at a faster rate compared to channel hopping of the low-energy TSCH protocol.

22. The system of claim 21, wherein synchronizing communications of the low-energy network node with the channel hopping pattern of the primary TSCH protocol causes the low-energy network node to switch channels at the faster rate of the primary TSCH protocol.

23. A method, comprising:
transmitting, by a low-energy network node to a parent node, a synchronization request for synchronizing communications with a channel hopping pattern of a primary TSCH protocol utilized by a parent node, the synchronization request transmitted on a low-energy network channel during a secondary portion of a first timeslot of a plurality of timeslots of the primary TSCH protocol, wherein the low-energy network channel and a primary TSCH channel associated with the first timeslot are distinct frequency channels;
listening for an acknowledgment signal indicating that the parent node received the synchronization request; and
upon determining that the acknowledgment signal was not received from the parent node, retransmitting the synchronization request during a second timeslot of the plurality of timeslots with a timing offset configured to align the retransmission of the synchronization request with a secondary portion of the second timeslot.

* * * * *